July 3, 1951 J. F. McBREARTY 2,559,451
LANDING GEAR WITH DRAG STRUT DYNAMIC DAMPER
Filed Sept. 12, 1947 2 Sheets-Sheet 1
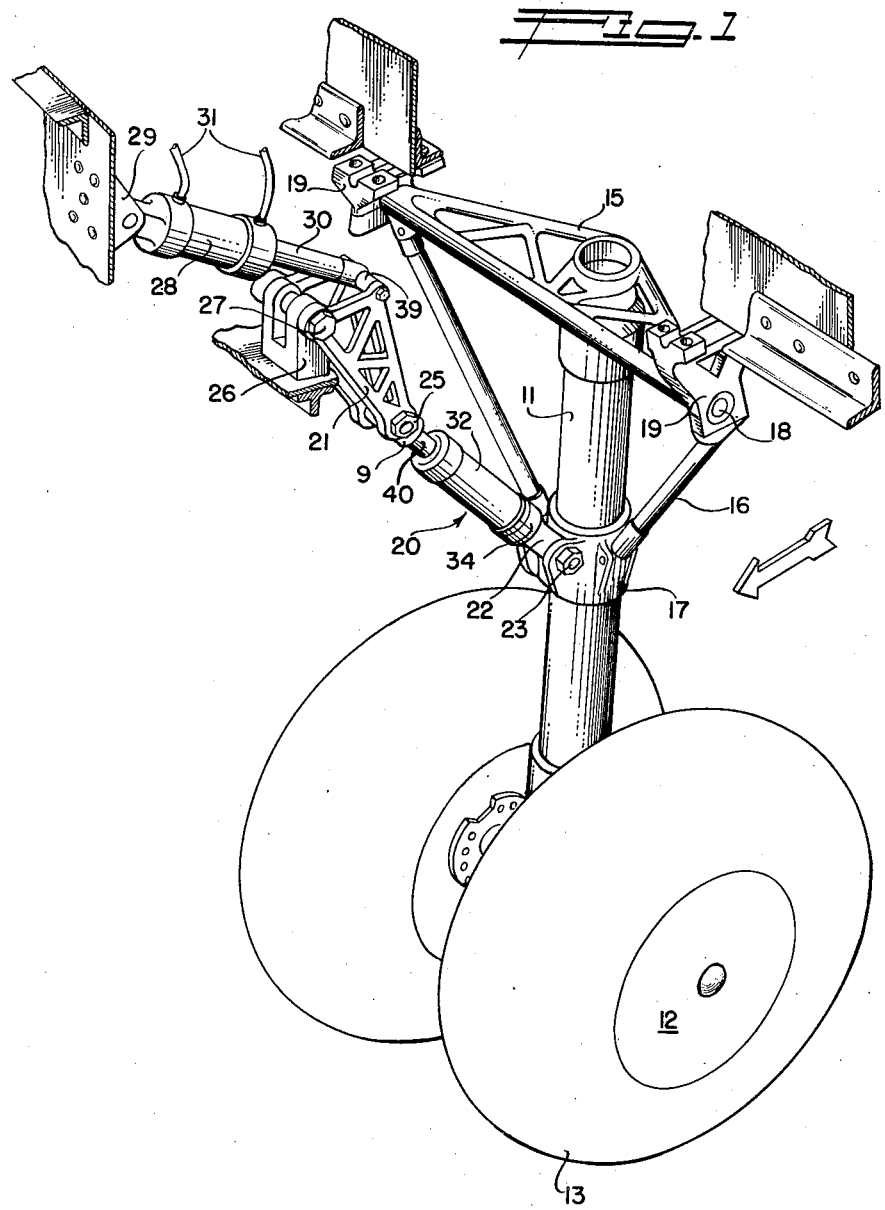
INVENTOR
JEROME F. McBREARTY
By George C. Sullivan
Agent July 3, 1951 — J. F. McBREARTY — 2,559,451
LANDING GEAR WITH DRAG STRUT DYNAMIC DAMPER
Filed Sept. 12, 1947 — 2 Sheets-Sheet 2
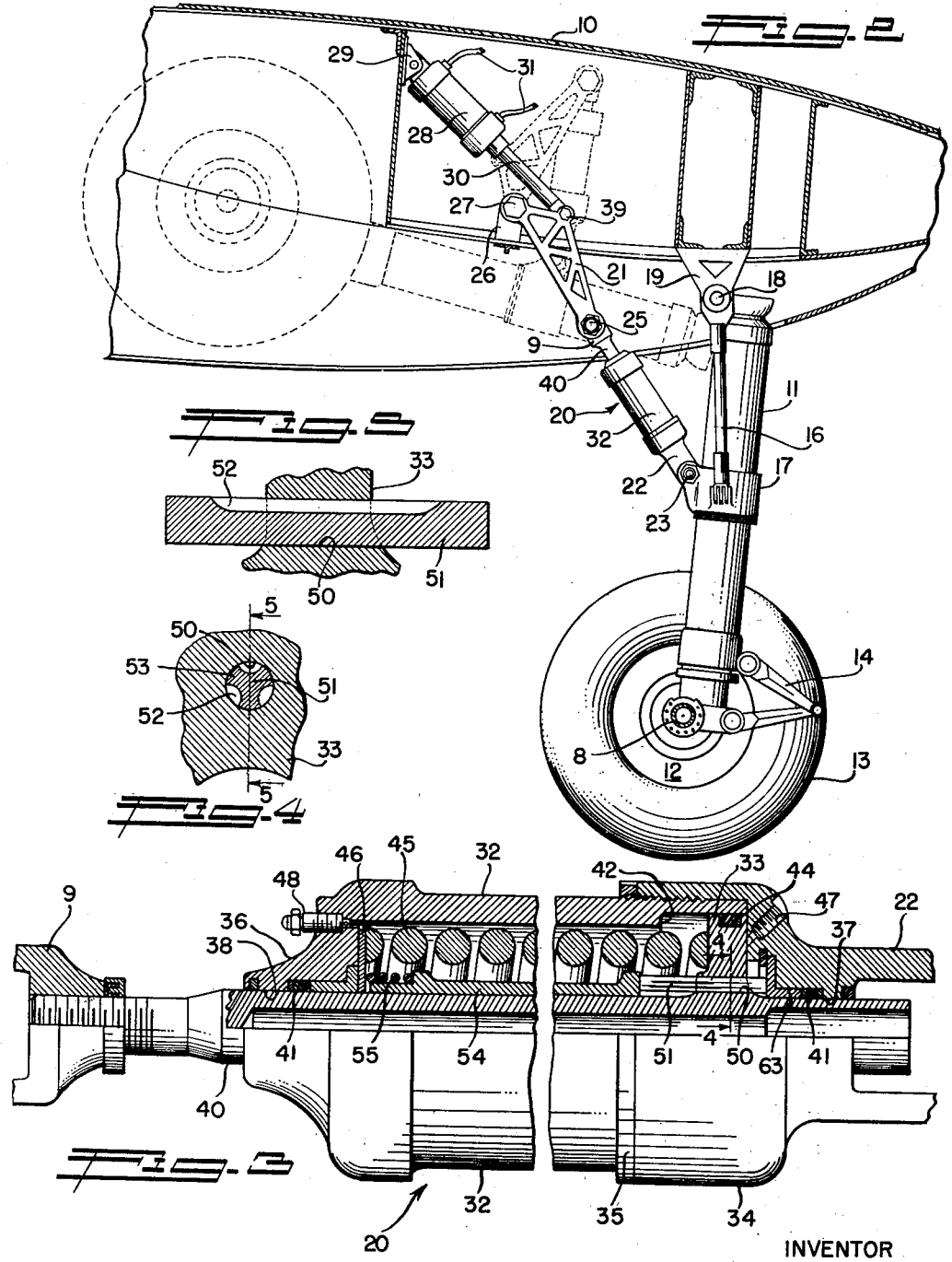
INVENTOR
JEROME F. McBREARTY
By George C. Sullivan
Agent Patented July 3, 1951

2,559,451

UNITED STATES PATENT OFFICE 2,559,451

LANDING GEAR WITH DRAG STRUT DYNAMIC DAMPER

Jerome F. McBrearty, North Hollywood, Calif., assignor to Lockheed Aircraft Corporation, Burbank, Calif.

Application September 12, 1947, Serial No. 773,549

2 Claims. (Cl. 244—103)

This invention relates to aircraft and relates more particularly to landing gear primarily adapted for heavier-than-air aircraft. It is a general object of the invention to provide a landing gear embodying simple practical means for effectively dampening the drag forces and resultant fore and aft oscillations of the gear accompanying landing or taxiing of the airplane.

The landing gear of an airplane is responsible for a large proportion of structural failures and accidents. Many of such failures occur during normal or routine landings in spite of the fact that the landing gears have been made heavier and stronger in an attempt to reduce the recurrence of these failures. A survey of the accident records reveals that such structural failures seldom occur due to excessive vertical or side loads, but are found to result more often from loads in the drag direction, that is either forward or aft. Increasing the overall landing gear strength to overcome the difficulty would necessitate a marked increase in the weight of these units or assemblies, which already constitute a rather large part of the total weight of the airplane, and would have doubtful success for reasons which will later become apparent. Fatigue effects may constitute a contributing factor in the numerous landing gear failures, but the fatiguing of the parts after short service life is simply indicative of the existence of abnormally high loads during routine landings. Although the general geometry and design of the modern landing gear, which usually consists of an approximately vertical shock absorbing strut braced against drag loads and side loads, may be improved, they are certainly not the primary reasons for the development of destructive loads in a normal landing. Thus, while the above and other factors have been recognized as capable of contributing to the many failures, they of themselves or in the aggregate are not the real cause of the trouble.

The landing gear of an airplane is an elastic structure and has a natural frequency of vibration in a mode corresponding to the fore and aft motion of the axle. This oscillatory motion occurs under the action of the wheel spin up drag forces which accompany acceleration of the wheels to the relative ground speed. The wheel spin up drag force which excites the fore and aft vibration of the gear is a function of several variables including the sinking speed and flare, the forward speed and wind, the attitude of the airplane, the conditions of the tires, the condition of the runway, variations in the coefficient of friction with speed, the weight of the airplane, etc. These variables, which are not all controllable by the pilot and which occur in routine landings, affect both the magnitude and duration of the wheel spin up force. Forces applied rapidly to an elastic structure, such as a landing gear, produce deflections and stresses quite different from those resulting from the same forces applied statically or in a slow manner. The deflections are greater by an amount depending upon the relationship of the rate of application of the force and the natural frequency of the structure. This phenomenon is usually referred to as dynamic overloading. I have determined that the landing gears of airplanes have a natural mode of vibration of the same order as the wheel spin up times and where the wheel spin up rates are a function of a plurality of uncontrollable variables, each with a wide range of values, there is a random chance that these values may occur in such a combination that dynamic overloads of extremely large magnitude may be imposed on a given landing gear. This may well occur during a normal or routine landing and no doubt accounts for many of the failures while making such landings. Furthermore, some other portion of the aircraft structure, such as the wing, nacelle or tail, may in certain instances respond to the fore and aft vibration or oscillation of the landing gear and thus experience dynamic repetitive loads. The present invention is concerned with the damping or elimination of the fore and aft oscillations of the landing gear resulting from the wheel spin up forces, skidding, brake chatter, etc. and the consequent avoidance of the abovementioned dynamic overloading of the gear and excitation of other parts of the airplane structure.

It is, therefore, an object of this invention to provide a landing gear incorporating a vibration damping device which dependably damps out and avoids the vibratory motion accompanying wheel spin up, and vibration produced by other causes, to eliminate dynamic overloading of the gear. The present invention provides a damping device associated with or directly embodied in the landing gear assembly to lessen the initial drag load, reduce the forward rebound to small proportions and to reduce the number of forward and aft oscillations per landing from ten to twenty reversals experienced with the typical modern landing gear to a single moderate cycle. This, of course, prevents failure caused by such dynamic overloading and avoids fatiguing of the structure. In addition, the damping device prevents vibratory drag forces due to brake chatter, skidding chatter, etc. from building up to dangerous proportions.

Another object of the invention is to provide a landing gear structure of the character referred to in which the means for damping out the fore and aft oscillatory motions does not in any way reduce the effectiveness of the shock absorber provided in the generally vertical oleo strut. The damper for reducing the fore and aft oscillation is incorporated in the drag system of the gear where it damps out the fore and aft motion of the axle without affecting the action of the generally vertical oleo strut.

A further object of the invention is to provide a landing gear assembly in which the damper or shock absorber for handling the fore and aft vibrations does not materially increase the weight of the assembly and if desired may be constructed for ready installation in previously manufactured present day landing gears.

Other features and objectives of the invention will become apparent from the following detailed description of a typical preferred form and application throughout which description reference will be made to the accompanying drawings in which:

Figure 1 is a perspective view of a landing gear embodying the present invention;

Figure 2 is a vertical sectional view showing the main strut and the drag strut in side elevation;

Figure 3 is an enlarged longitudinal quarter section of the vibration damper of the invention;

Figure 4 is an enlarged fragmentary transverse sectional view taken substantially as indicated by line 4—4 on Figure 3; and Figure 5 is a fragmentary sectional view of the metering means taken as indicated by line 5—5 on Figure 4.

The present invention is not confined to landing gear of any particular design or airplane, but is capable of embodiment in landing gears varying considerable in size, type, etc. In the drawings, the invention is shown embodied in a main landing gear of an airplane, it being understood that while the fore and aft vibratory effects are usually of a minor character in a nose gear, the invention may, if desired, be incorporated in the nose gear. Accordingly, the following detailed description of the typical application illustrated is not to be construed as limiting the invention to this particular structure or embodiment.

Referring to Figure 2 of the drawings, the full lines illustrate the landing gear in the extended or operative position, while the broken lines show it in the retracted position within the wing structure 10 of the airplane. The landing gear includes an oleo-pneumatic strut 11 carrying at its lower end an axle 8. The axle 8 in turn carries a pair of wheels 12 equipped with pneumatic tires 13. The wheels 12 have the usual brakes, not shown, and articulated torque arms 14 are associated with the piston and cylinder of the strut 11 to maintain these parts in alignment. The upper end of the strut 11 engages in a generally horizontal fulcrum member 15, see Figure 1, and side struts 16 have their lower ends secured to a collar 17 on the strut. The upper ends of the side struts 16 are attached to the fulcrum member 15. The fulcrum member 15 is pivoted in bearings 18 carried by brackets on the wing structure 10. This mounting allows the strut 11 and associated parts to be moved from the retracted broken line position of Figure 2 to the extended generally vertical full line position of Figures 1 and 2.

The gear further includes a drag strut assembly which serves to retract and extend the strut 11 and aids in transferring fore and aft landing loads to the wing structure. The drag strut assembly comprises a lower link 20 to be described below and an upper link 21. The lower link 20 has a forked terminal 22 pivotally secured to the collar 17 of the strut 11 by a pin or bolt 23 and the upper end of the link 20 has a similar terminal 9 secured to the upper link 21 by a bolt 25. A pin or bolt 27 pivotally secures the upper end of the link 21 to a bracket 26 of the wing structure.

A cylinder and piston mechanism 28 is provided to actuate the landing gear between the retracted and extended positions. The mechanism 28 has one end pivotally attached to a bracket 29 on the wing structure 10 and its piston rod 30 is pivotally connected with the strut or link 21 of the drag link at 39. Valved lines 31 under the control of the pilot or flight engineer deliver actuating hydraulic pressure to the cylinder of the mechanism 28. It is believed that it will be understood how the mechanism 28 serves to move the landing gear between its retracted and extended positions. Locking devices may be employed to releasably hold the landing gear in its two positions, but as these form no essential part of the present invention they are omitted from the drawings.

In accordance with the invention a vibration absorbing device or shock absorber is associated with or incorporated in the drag strut assembly. In the particular embodiment of the invention illustrated the means for damping the fore and aft vibrations or oscillations is incorporated in or constitutes the lower link 20 of the drag strut assembly. The damper is of the mechanical-hydraulic type and includes a cylinder 32 and a piston 33 operating in the cylinder. A cap or head 34 is screw-threaded on the lower end of the cylinder 32 and the above described terminal 22 may be integral with the head. A lock nut 35 secures the threaded head in place. An integral head 36 is provided at the opposite end of the cylinder 32. The heads 34 and 36 have aligned axial openings 37 and 38 for guiding the piston as will be later described.

The piston 33 of the vibration damper is carried by and may be integral with an elongate rod 40. The outer end of the rod 40 carries the above-mentioned terminal 9 which may have adjustable screw-threaded engagement on the rod. The piston rod 40 slidably enters the cylinder head opening 38 to pass axially through the cylinder and its remote end is slidably received in the opening 37. Suitable seals 41 are provided in the openings 37 and 38 to seal about the piston rod 40 to prevent the leakage of fluid from the cylinder 32. The piston proper 33, which may be an integral annular enlargement of the rod 40, operates in the end portion of the cylinder 32 adjacent to the head 34. This portion of the cylinder 32 is enlarged in internal diameter to receive the piston 33 and to present an annular internal shoulder 42 which opposes the head 34. The stroke or movement of the piston 33 is limited by the shoulder 42 and the inner surface of the cylinder head 34. I have found in practice that only a relatively short piston stroke is required and the engagement of the piston 33 with the shoulder 42 and head 34 prevents excessive elongation and contraction of the drag strut assembly. The periphery of the piston 33 is grooved to carry a seal assembly 44 for slidably sealing with the wall or internal surface of the cylinder 32.

Mechanical means or spring means is incorporated in the vibration damper to yieldingly hold or "cock" the landing gear in its forward position and to return it to the forward position when moved during taxiing, etc. The arrow in Figure 1 indicates the forward direction of motion of the airplane when landing and it will be seen because the drag strut assembly is arranged at the forward side of the main or shock strut 11, the drag strut assembly is subjected to tension and elongation when the wheels 12 come into contact with the runaway. A relatively strong spring 45 is provided in the cylinder 32 to yieldingly resist this tendency of the drag strut to elongate during the wheel spin up. The spring 45 is a helical or coil spring and is engaged between the piston 33 and a washer 46 arranged against the inner side of the cylinder head 36.

The cylinder 32 contains a body of suitable liquid, such as hydraulic fluid and metering means is provided to control the flow of the fluid through or past the piston 33 to govern relative axial movement between the piston and cylinder and thus control or dampen fore and aft oscillation of the landing gear. The cap or cylinder head 34 has a port and fitting 47 to facilitate the supplying of the hydraulic fluid to the cylinder 32 and the head 36 has a bleed port and fitting 48 to bleed air from the cylinder when the same is being charged with the fluid. It is to be understood that the bore or space within the cylinder is preferably entirely occupied by the selected fluid.

The metering means mentioned above includes a bore or port 50 extending axially through the piston 33. The metering port 50 is preferably of uniform diameter or capacity throughout its length and serves to join or connect the opposite ends of the cylinder cavity or bore. A metering pin 51 controls or meters the passage of fluid through the port 50. The metering pin 51, which is best illustrated in Figures 3, 4 and 5, is an elongated part passing axially through the port 50 and secured to the cylinder assembly to be stationary with respect thereto. In the form of the invention illustrated the pin 51 has a plurality of circumferentially spaced axially extending external fluid passages or grooves 52. The grooves 52 are equally spaced to leave axially extending lobes or ridges 53 which may slidably engage the wall of the metering port 50 throughout the entire stroke of the piston 33. The grooves 52 may be proportioned and contoured to meter the fluid flow in a manner to attain the desired control of the relative movement between the cylinder 32 and the piston 33 and thus effect the desired damping of the landing gear movement or oscillation. In the application of the invention illustrated the grooves 52 are of maximum depth and fluid capacity in the portion of the pin 51 traversed by the piston 33 during the intermediate phase of the piston travel and of minimum capacity at their end portions which are traversed by the piston during the end portions of its stroke. Accordingly, the pin 51 serves to meter or restrict the flow through the port 50 to the greatest extent during initial and final phases of piston movement and allows the greatest freedom of piston movement during the intermediate portions of the stroke. The contour and capacity of the grooves 52 provide for the desired control characteristics of the damper. I prefer to construct the grooves 52 so that relative axial movement between the cylinder 32 and piston 33 is substantially restricted or retarded at each end of the stroke to prevent forceful contact of the piston with the head 34 and shoulder 42.

One end of the metering pin 51 engages against the head 34 or the gland 63 of the seal 41 in the head 34. The other end of the pin 51 is engaged by a sleeve 54 surrounding and slidably receiving the piston rod 40. A spring 55 is arranged under compression between the abovementioned washer 46 and a shoulder on the sleeve 54 to hold the sleeve in engagement with the gland 63. With the construction just described the metering pin 51 need not be disturbed when the cylinder head 34 is adjusted along the cylinder 32 by means of its screw threads to vary the stroke of the damper.

It is believed that the operation of the apparatus will be readily understood from the foregoing detailed description. The landing gear may be retracted and extended by means of the actuating cylinder and piston mechanism 28 in the usual manner. In making a landing the engagement of the wheels 12 with the runway rotates the wheels on their axle 8. It has been found that the wheels 12 will rotate or spin up to the maximum speed in a fraction of a second, for example, say in one-tenth of a second. The loads induced in the landing gear in rapidly bringing the wheels 12 up to speed during landing have been herein termed the wheel spin up drag forces. These drag forces are often substantial and are necessarily the function of several variables, such as the airplane sinking speed and flare, the forward airplane speed and wind, the altitude of the airplane, the condition of the tires and runway, variations in the coefficient of friction with speed, the weight of the airplane, etc. This suddently or rapidly applied drag force will in the ordinary landing gear installation produce a substantial rearward movement of the landing gear and, therefore, impose considerable tension on the drag strut. This is usually followed by a rebound of the landing gear in the forward direction and sustained or continued oscillation of the gear. The uncontrolled initial drag force and initial rebound followed by the oscillations of gradually diminishing intensity are believed to be the cause of many structural failures, which have in the past been considered of unknown origin. Where the present invention has been employed it has been found that the damper 20, described in detail above, reduces the initial tension peak in the drag strut assembly to a substantial degree and thus reduces the rearward deflection of the main shock strut 11 to a still lower value. The spring 45 is compressed and the hydraulic fluid in the cylinder is displaced through the port 50 under the control of the metering pin 51 as described above to effect this damping or reduction of the initial drag load effects. The forward rebound which tends to impose compression on the drag strut assembly is likewise effectively controlled by the damper. It has been found that the first compression peak in the drag strut is reduced to a very low value by the damper 20, the metering pin 51 cooperating with the port 50 to bring about this damping out of the otherwise heavy rebound. Where the initial drag load and the initial rebound are both reduced and controlled in this manner, further oscillation of the landing gear is practically eliminated. This is to be contrasted with a conventional landing gear installation where both the initial drag force and initial rebound are uncontrolled and prolonged oscillations accordingly follow. The provision of the landing gear of the present invention thus solves a problem that has not to my knowledge been generally recognized heretofore and provides a landing gear which is not subject to failure as a result of the fore and aft oscillatory forces which attend the use of a typical landing gear. Furthermore, where the oscillations resulting from the wheel spin up drag forces are effectively damped out, there is no excitation of the airplane structure, with possible damage, as a result of such vibration.

Having described only a typical preferred form and application of the invention, I do not wish to be limited to the particular details set forth but wish to reserve to myself any features or modifications that may fall within the scope of the following claims.

I claim as my invention:

1. A retractable landing gear for an airplane including a wheel-carrying shock strut, means pivotally connecting said shock strut to said airplane for movement between an elevated retracted position and a depending extended position, a drag strut located ahead of said shock strut and including two links which are pivotally connected together so that they may be collapsed and extended and which in their extended position are operative to brace said shock strut against movement in fore and aft directions, one of said links being pivotally connected to a fixed part of the airplane and the other of said links being pivotally connected to said shock strut, means connected to said first link for swinging it about its axis to extend and retract said shock strut, one of said links including a cylinder and a piston operable therein and said cylinder and piston having extensions for pivotally connecting the link in said drag strut so that it may function therein in the manner described, said cylinder providing a chamber for a hydraulic fluid, a spring arranged between said cylinder and piston for yieldingly resisting movement of said shock strut in an aft direction, and means providing a restricted flow of said fluid from either side of said piston to the other to yieldingly resist movement of said shock strut in both of said directions.

2. A retractable landing gear for an airplane including a wheel-carrying shock strut, means pivotally connecting said shock strut to said airplane for movement between an elevated retracted position and a depending extended position, a drag strut located ahead of said shock strut and including two links which are pivotally connected together so that they may be collapsed and extended and which in their extended position are operative to brace said shock strut against movement in fore and aft directions, one of said links being pivotally connected to a fixed part of the airplane and the other of said links being pivotally connected to said shock strut, means connected to said first link for swinging it about its axis to extend and retract said shock strut, said second link including a cylinder and a piston and said cylinder and piston having extensions for pivotally connecting the link in said drag strut so that it may function therein in the manner described, said cylinder providing a chamber for a hydraulic fluid, a spring arranged between said cylinder and piston for yieldingly resisting movement of said shock strut in an aft direction, and means providing a restricted flow of said fluid from either side of said piston to the other to yieldingly resist movement of said shock strut in both of said directions.

JEROME F. McBREARTY.

REFERENCES CITED

The following references are of record in the file of this patent:

UNITED STATES PATENTS

| Number | Name | Date |
|---|---|---|
| 483,529 | Bryon | Oct. 4, 1892 |
| 1,445,414 | Schuessler | Feb. 13, 1923 |
| 1,600,154 | Van Vliet | Sept. 14, 1926 |
| 1,864,134 | Harris | June 21, 1932 |
| 2,364,865 | Mattingly | Dec. 12, 1944 |
| 2,437,135 | Steinhoff | Mar. 2, 1948 |

FOREIGN PATENTS

| Number | Country | Date |
|---|---|---|
| 353,191 | Italy | Oct. 7, 1937 |